(12) United States Patent
Bennett (10) Patent No.: US 7,270,295 B2
(45) Date of Patent: Sep. 18, 2007

(54) SOLAR THERMAL AIRCRAFT

(75) Inventor: Charles L. Bennett, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 177 days.

(21) Appl. No.: 10/835,665

(22) Filed: Apr. 30, 2004

(65) Prior Publication Data
US 2005/0242232 A1    Nov. 3, 2005

(51) Int. Cl.
*B64D 27/24* (2006.01)
(52) U.S. Cl. ...................................................... 244/59
(58) Field of Classification Search .............. 244/53 R, 244/13, 60, 59
See application file for complete search history.

(56) References Cited

U.S. PATENT DOCUMENTS

| | | | |
|---|---|---|---|
| 2,462,201 A * | 2/1949 | Kilgore et al. ................ | 244/60 |
| 3,089,670 A | 5/1963 | Johnson | |
| 3,182,653 A | 5/1965 | Mavleos et al. | |
| 4,403,755 A | 9/1983 | Gutsche | |
| 4,415,133 A | 11/1983 | Phillips | |
| 4,438,760 A | 3/1984 | Radebold | |
| 4,534,525 A * | 8/1985 | Bliamptis ..................... | 244/30 |
| 4,553,392 A | 11/1985 | Chagnot et al. | |
| 4,586,334 A * | 5/1986 | Nilsson et al. ................ | 60/524 |
| 4,697,761 A | 10/1987 | Long | |
| 4,707,990 A * | 11/1987 | Meijer ..................... | 60/641.15 |
| 4,768,738 A * | 9/1988 | Weinert ..................... | 244/53 R |
| 5,106,035 A * | 4/1992 | Langford, III ................ | 244/59 |
| 5,113,659 A | 5/1992 | Baker et al. | |
| 5,228,293 A * | 7/1993 | Vitale ...................... | 60/641.14 |
| 5,518,205 A | 5/1996 | Wurst et al. | |
| 5,810,284 A | 9/1998 | Hibbs et al. | |
| 6,364,253 B1 * | 4/2002 | Cavanagh ................... | 244/190 |
| 6,487,859 B2 | 12/2002 | Mehos et al. | |
| 6,908,702 B2 * | 6/2005 | McElroy et al. .............. | 429/26 |

OTHER PUBLICATIONS

H. Price et al, Reducing the cost of Energy from Parabolic Trough Solar Power Plants, National Renewable Energy Laboratory, Golden, Colorado, Jan. 2003.
P. Dunn et al, Heat Pipes (Second Edition), Pergamon Press.
Jean Cazeneuve, One Solution Originale au probleme du stockage de lenergie, Entropie No. 23 Sep.-Oct. 1968.
S.J.Pawel, Compatibility of potential containment materials with molten lithium hydride at 800C, Journal of Nuclear Materials 207 (1993) 136-152.

* cited by examiner

*Primary Examiner*—Tien Dinh
(74) *Attorney, Agent, or Firm*—James S. Tak; John H. Lee (57) ABSTRACT

A solar thermal powered aircraft powered by heat energy from the sun. A heat engine, such as a Stirling engine, is carried by the aircraft body for producing power for a propulsion mechanism, such as a propeller. The heat engine has a thermal battery in thermal contact with it so that heat is supplied from the thermal battery. A solar concentrator, such as reflective parabolic trough, is movably connected to an optically transparent section of the aircraft body for receiving and concentrating solar energy from within the aircraft. Concentrated solar energy is collected by a heat collection and transport conduit, and heat transported to the thermal battery. A solar tracker includes a heliostat for determining optimal alignment with the sun, and a drive motor actuating the solar concentrator into optimal alignment with the sun based on a determination by the heliostat.

96 Claims, 7 Drawing Sheets

Cooling Air flow

SOLAR THERMAL AIRCRAFT

The United States Government has rights in this invention pursuant to Contract No. W-7405-ENG-48 between the United States Department of Energy and the University of California for the operation of Lawrence Livermore National Laboratory.

I. FIELD OF THE INVENTION

This invention relates to solar powered aircraft and energy generation systems using heat engines to convert solar thermal energy into mechanical energy. In particular, the invention relates to a solar powered aircraft employing a lightweight and highly efficient solar thermal power system having a heat engine with a heat storage medium in thermal contact therewith, a parabolic trough-type solar concentrator actuably mounted in an optically transparent section of the aircraft to receive and concentrate solar energy, and a heat pipe at a focal axis of the parabolic trough for collecting the concentrated solar energy and transporting heat to the heat storage medium. A solar tracker determines optimal alignment of the solar concentrator with respect to the sun and actuates the solar concentrator to achieve optimal alignment. The heat storage medium has a high specific energy, especially for the temperature range of 800° C. and above, which enables sufficient energy storage during sunlight hours and is capable of maintaining power for night time operation to enable continuous flight over a substantially indefinite period.

II. BACKGROUND OF THE INVENTION

Working prototypes have demonstrated the feasibility and utility of solar powered aircraft. Many if not most solar powered aircraft, however, rely on the photovoltaic conversion of sunlight to electricity to power an electric motor-based propulsion system. Batteries (or electrolyzer, gas storage, and regenerative fuel cells) are carried onboard the aircraft to store electrical energy and keep the aircraft aloft during the night, so that flight time is not limited by fuel supply as it is on a conventional aircraft. It is widely recognized, however, that onboard voltaic batteries or electrolyzer, gas storage, and regenerative fuel cell systems impose a substantial weight burden for all aircraft, and especially for high-altitude, long range aircraft.

Another problem associated with photovoltaic power generation arrangements for aircraft, especially high-altitude, long-range aircraft, is the need to orient/point the photovoltaic solar cells to face the sun. Having wing-mounted arrays of solar panels can limit the efficiency of the collection of solar power, especially at dawn and dusk, as sunlight seldom strikes the solar panels "face on". Thus in order to achieve a direct angle of impingement, the aircraft could be "banked" (i.e. laterally incline the aircraft, such as by elevating one wing or side higher or lower in relation to the opposite wing or side) in order to face the sun. This practice is disclosed by U.S. Pat. No. 4,415,133 to Phillips, as well as U.S. Pat. No. 5,518,205 to Wurst, et al. Conventional aircraft, however, cannot maintain straight flight at a large bank angle for extended lengths of time. Moreover, a related problem is the significant restriction on the latitude range over which aircraft may be flow, often seen with wing mounted solar energy collection means, i.e. photovoltaic solar cells, characteristic of the prior art. During winter, at higher northern latitudes, the maximum angle of the sun above the horizon may be relatively small, and thus the effective collection area of the wing surface may be severely restricted.

While the Phillips reference alternatively suggests that solar cells may be placed on a tilting panel within a transparent fuselage structure, this arrangement would require the inclusion of a cooling system for the inner located cells, with the associated weight and aerodynamic drag penalties. The cooling requirement discussed in Phillips for maintaining high efficiency of inside-mounted cells is a generic limitation common to all photo-voltaic solar cell powered aircraft. This same limitation precludes the practical use of solar cells at the focus of a high concentration factor solar collector, since excessive heating of solar cells leads to substantially reduced efficiency.

Furthermore, the efficiency of photovoltaic electric energy collection, storage, and utilization in the prior art is relatively limited. Photovoltaic arrays of high efficiency are very expensive and tend to lose efficiency at elevated temperatures, and thus are not practical to use at the focus of a high flux solar concentrator. The prior art system of photovoltaic electric energy collection, storage, and utilization has a relatively small power to mass ratio. Thus the aircraft must typically fly at an altitude high enough to be above the clouds, and to avoid winds with velocities much higher than the airspeed of the vehicle, as described in the Phillips reference. Because of its long endurance and limited weight-carrying ability, this type of vehicle is normally considered to be a pilotless aircraft.

Various ground based solar energy collectors and concentrators, and interfaces to heat storage media and heat engines are also known. A few examples include: U.S. Pat. No. 4,586,334 to Nilsson, and U.S. Pat. No. 6,487,859 to Mehos. The Nilsson patent discloses " . . . a solar energy power generation system which includes means for collecting and concentrating solar energy; heat storage means; Stirling engine means for producing power", and " . . . the means for collecting and concentrating solar energy is a reflective dish; and the heat transfer means includes first and second heat pipes; the heat storage means is preferably a phase change medium . . . " The Mehos patent discloses: " . . . sodium heat pipe receivers for dish/Stirling systems", and cites references demonstrating: " . . .sodium vapor temperatures up to 790° C." Additionally, U.S. Pat. No. 4,125,122 discloses a heat pipe receiving energy from a solar concentrator, U.S. Pat. No. 6,700,054B2 describes connecting to a Stirling engine, among other things, and U.S. Pat. No. 4,088,120 describes a parabolic trough with a heat pipe at the focus connected to a heat storage medium. None of these representative references, however, disclose how the solar energy generation and storage system can be made sufficiently lightweight that it would be able to provide for the overnight propulsion of a solar-powered aircraft.

In addition, the utility of LiH as a thermal energy storage medium, i.e. a "thermal battery," is known, and is based on the very high thermal energy per unit mass characteristic of LiH. For example, the specific energy released in the cooling of one kg of LiH from 1200 K to 600 K is 1900 W-hr. In contrast, lithium ion electrical storage batteries contain less than 10% as much energy per kg. Even a Hydrogen-Oxygen recyclable fuel cell with associated electrolyzer and gas storage contains no more than approximately 1000 W-hr per kg. It is appreciated that no other known solid, liquid, (or gaseous, if the mass of the requisite container is accounted for) compound has as high a specific thermal energy content as LiH for this temperature range. One example of LiH used as a thermal energy storage medium is disclosed in U.S. Pat.

No. 3,182,653 to Mavleos et al. and directed to a Lithium hydride body heating device that uses LiH as a phase change medium to store heat energy for use in providing warmth to a diver. The '653 patent, however, does not disclose how highly reactive LiH may be safely contained for long periods of time. Theoretically, pure LiH has an infinite hydrogen vapor pressure just beyond the melting point of LiH. Thus, a container of LiH constructed according to the Mavleos disclosure, for example, may explode upon reaching the melting point of LiH at about 700° C.

Accordingly, it is an object of the present invention to provide an aircraft powered by the heat of the sun.

Another object of the present invention is to provide a lightweight and highly efficient solar power plant and system for powering an aircraft by the heat of the sun.

Another object of the present invention is to provide an internally mounted solar power plant and system for powering an aircraft which does not require internal cooling.

And another object of the present invention is to provide a means for efficiently powering a solar aircraft by using a high efficiency heat engine, such as a Stirling engine.

Another object of the present invention is to provide a means for storing sufficient solar energy accumulated during the day to enable flight through the nighttime without excessive mass burden.

Another object of the present invention is to provide a means for maximizing solar energy collection and concentration by optimally aligning a heat collection element to the sun without re-orienting or otherwise changing the flight characteristics of the aircraft, e.g. banking.

Another object of the present invention is to provide a means for conserving heat energy during night time operation by preventing backflow of a heat transfer working fluid of a heat pipe.

These objects are achieved by the present invention described hereinafter.

III. SUMMARY OF THE INVENTION

One aspect of the present invention includes an aircraft powered by the heat of the sun comprising: an aircraft body capable of producing lift and sustained free flight when propelled; heat engine means carried by said aircraft body for producing power; propulsion means powered by said heat engine means for propelling said aircraft; heat storage means in thermal contact with said heat engine means for supplying heat thereto; solar concentration means movably connected to said aircraft body for receiving and concentrating solar energy; solar tracking means including means for determining whether said solar concentration means is optimally aligned with the sun, and means for actuating said solar concentration means into optimal alignment with the sun based on said determination; and heat collection/transport means for collecting the concentrated solar energy and transporting heat to said heat storage means.

Another aspect of the present invention includes a solar thermal powered aircraft comprising: an aircraft fuselage having an optically-transparent section; wing means extending from said aircraft fuselage and capable of producing lift and sustained free flight when propelled; a heat engine for producing power and carried by said aircraft fuselage, said heat engine having a heat storage medium in thermal contact therewith for supplying heat thereto; at least one propulsion device(s) powered by said heat engine for propelling said aircraft; a solar concentrator movably mounted in said optically transparent section so that incident solar flux is transmitted therethrough to said solar concentrator for receiving and concentrating solar energy; a solar tracker adapted to determine whether said solar concentrator is optimally aligned with the sun, and actuate said solar concentrator into optimal alignment with the sun based on said determination, for tracking the position of the sun; and a heat collection and transporting conduit adapted to collect the concentrated solar energy and transport heat to said heat storage medium.

Another aspect of the present invention includes a solar thermal powered aircraft comprising: an aircraft fuselage; wing means extending from said aircraft fuselage and capable of producing lift and sustained free flight when propelled, said wing means having at least two optically-transparent sections; and associated with each optically-transparent section: a heat engine carried by said wing means for producing power, and having a heat storage medium in thermal contact therewith for supplying heat thereto; a propulsion device powered by the corresponding heat engine for propelling said aircraft; a solar concentrator movably mounted in the corresponding optically transparent section so that incident solar flux is transmitted therethrough to said solar concentrator for receiving and concentrating solar energy; a solar tracker adapted to determine whether the corresponding solar concentrator is optimally aligned with the sun and to actuate said solar concentrator into optimal alignment with the sun based on said determination, for tracking the position of the sun; and a heat collection and transporting conduit adapted to collect the concentrated solar energy and transport heat to the corresponding heat storage medium.

Another aspect of the present invention includes an aircraft powered by the heat of the sun comprising: an aircraft body capable of producing lift and sustained free flight when propelled; heat engine means carried by said aircraft body for producing power; propulsion means powered by said heat engine means for propelling said aircraft; solar concentration means movably connected to said aircraft body for receiving and concentrating solar energy; solar tracking means including means for determining whether said solar concentration means is optimally aligned with the sun, and means for actuating said solar concentration means into optimal alignment with the sun based on said determination; and heat collection/transport means for collecting the concentrated solar energy and transporting heat to said heat engine means.

Another aspect of the present invention includes a solar thermal power plant comprising: a heat engine for producing power; a heat storage medium in thermal contact with a hot side of said heat engine for supplying heat thereto; an actuable solar concentrator for receiving and concentrating solar energy; a solar tracker adapted to determine whether the corresponding solar concentrator is optimally aligned with the sun and to actuate said solar concentrator into optimal alignment with the sun based on said determination, for tracking the position of the sun; and a heat collection and transporting conduit adapted to collect the concentrated solar energy and transport heat to said heat storage medium.

Another aspect of the present invention includes an improved Stirling engine of a type having a crankcase with opposing hot and cold heat exchanging ends, a piston capable of reciprocating within said crankcase between the hot and cold heat exchanging ends, a crankshaft coupled to said piston and extending out from said crankcase so that reciprocation of said piston rotates said crankshaft, and a journal surrounding said crankshaft, the improvement comprising: at least one helical groove on a surface of one of said crankshaft and said journal and bounded by a surface of the other one of said crankshaft and said journal, said helical groove(s) communicating between an inner crankcase volume and the ambient atmosphere so that the relative motion between the rotating crankshaft and said journal pumps ambient atmosphere into said crankcase to self-pressurize the same.

Another aspect of the present invention includes an improved Stirling engine of a type having a crankcase with opposing hot and cold heat exchanging ends, a piston capable of reciprocating within said crankcase between the hot and cold heat exchanging ends, a crankshaft coupled to said piston and extending out from said crankcase so that reciprocation of said piston rotates said crankshaft, and a journal surrounding said crankshaft, the improvement comprising: a working fluid within an hermetically sealed crankcase; a crankcase pressure relief valve for controlling the crankcase pressure and the power output of said Stirling engine; a closed reservoir for receiving working fluid released from said crankcase pressure relief valve; and at least one helical groove on a surface of one of said crankshaft and said journal and bounded by a surface of the other one of said crankshaft and said journal, said helical groove(s) communicating between an inner crankcase volume and said closed reservoir so that the relative motion between the rotating crankshaft and said journal pumps the working fluid into said crankcase to self-pressurize the same, whereby working fluid released from the crankcase is recycled back into said crankcase.

Another aspect of the present invention includes a solar thermal battery for use with a heat engine, comprising: a thermally insulated container; a heat storage medium contained in said thermally insulated container and in thermal contact with a hot side of a heat engine for supplying heat thereto, said heat storage medium comprising a mixture of lithium hydride and lithium metal.

The present invention is generally directed to a lightweight, highly efficient solar thermal powered aircraft, as well as a lightweight, highly efficient solar thermal power plant for generating mechanical power from solar energy. The solar thermal power plant of the present invention powering the aircraft comprises a number of components/subsystems including: a solar heat engine such as a Stirling engine, a thermal battery and its associated multi-layer thermal insulation; a solar concentrator mirror and an associated solar tracker for determining optimal alignment with the sun and actuating into optimal alignment; a heat collector and its associated heat pipe collecting and transporting heat to the thermal battery. The solar concentrator mirror is positioned at an optically transparent section of the aircraft body to allow impinging solar radiation to pass through to the solar concentrator. These components together in the manner described herein, produce a comparably higher power to mass ratio than photovoltaic solar powered aircraft, which is an important parameter for the propulsion system of high altitude aircraft in particular.

IV. BRIEF DESCRIPTION OF THE DRAWINGS

The accompanying drawings, which are incorporated into and form a part of the disclosure, are as follows:

FIG. 4 is an enlarged cross-sectional view of the heat collection element enclosed in the circle 4 of FIG. 3a.

V. DETAILED DESCRIPTION

Reference numerals used in the following description are listed in Table 1.

TABLE 1

| | |
|---|---|
| 100 | Solar thermal powered aircraft |
| 102 | Wing |
| 103 | Fuselage |
| 104 | Rudder |
| 105 | Elevator |
| 106 | Aileron |
| 107 | Transmission |
| 108 | Cooling air inlet channel |
| 109 | Propeller |
| 110 | Concentrator mirror |
| 111 | Ruddervator |
| 112 | Transparent fuselage skin |
| 113 | Back-reflector |
| 114 | Solar concentrator support |
| 115 | Solar concentrator drive motor |
| 116 | Heliostat |
| 117 | Heliostat Photovoltaic A |
| 118 | Heliostat Photovoltaic B |
| 119 | Heliostat Photovoltaic C |
| 120 | Heat collector |
| 121 | Antireflection coating |
| 122 | Heat collector envelope |
| 123 | Evacuated space |
| 124 | Heat collector coating |
| 125 | Stainless steel shell |
| 126 | Vapor phase sodium |
| 127 | Liquid phase sodium |

TABLE 1-continued

| | |
|---|---|
| 128 | Sodium condenser |
| 129 | Heat pipe |
| 130 | Thermal battery |
| 131 | Highly reflective vacuum shell |
| 132 | MLI (Multi-layer insulation) layers of highly reflective material |
| 133 | LiH containment shell structure |
| 134 | Hydrogen & other dissociation products of LiH |
| 135 | Spacers between MLI layers |
| 136 | Lithium hydride and lithium |
| 137 | Lithium impervious alloy |
| 139 | Gold layer |
| 140 | Heat engine |
| 141 | Cooling fins |
| 142 | Hot side heat exchanger |
| 143 | Regenerator heat exchanger |
| 144 | Cold side heat exchanger |
| 145 | Crankshaft pump |
| 146 | Filter |
| 147 | Crank mechanism |
| 148 | Crankshaft |
| 149 | Crankcase pressure relief valve |
| 150 | Ducted fan |
| 151 | Expansion space |
| 152 | Displacer piston |
| 153 | Compression space |
| 154 | Power piston |
| 155 | Crankcase space |
| 156 | Displacer piston gap |
| 157 | Power piston gap |
| 158 | Bend region of heat pipe |
| 160 | Working fluid pressure vessel |
| 161 | Working fluid reservoir |
| 162 | Gas tight journal bearing |
| 163 | Hydrogen permeable cap |
| 164 | Operational amplifier |

Figure 1:
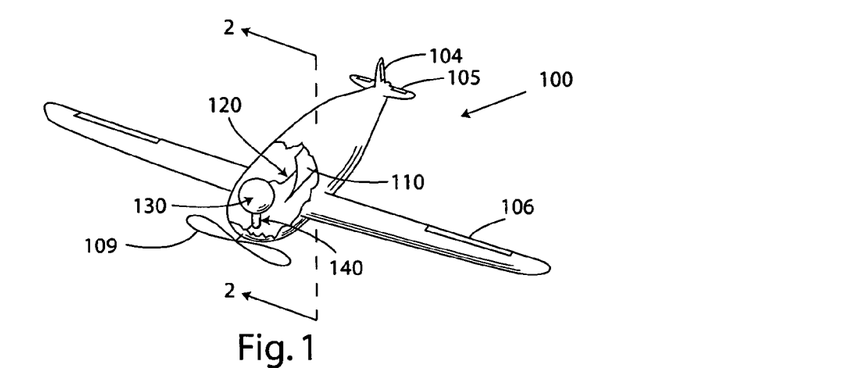
FIG. 1 is a perspective view of an exemplary embodiment of the solar thermal aircraft of the present invention.
Figure 2:
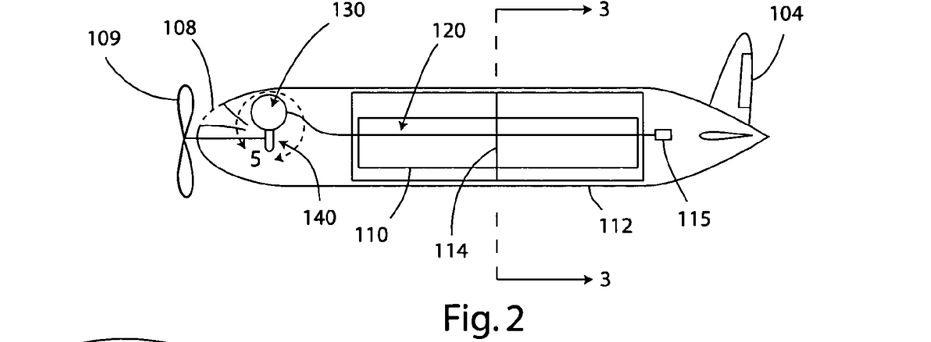
FIG. 2 is a side cross-sectional view of the solar thermal aircraft taken along the line 2—2 of FIG. 1.
Figure 14:
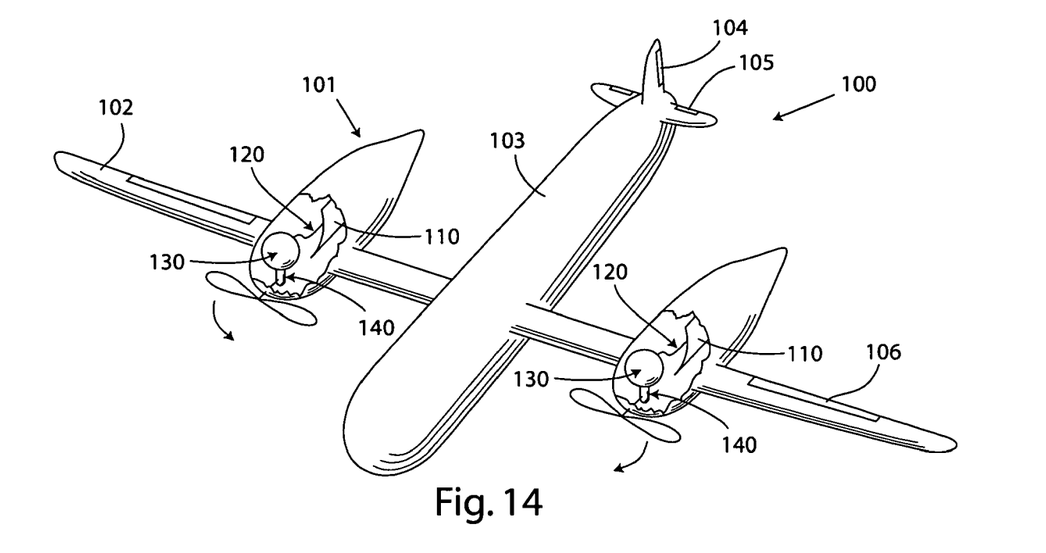
FIG. 14 is a perspective view of a twin engine/twin collector solar thermal aircraft.
Figure 15:
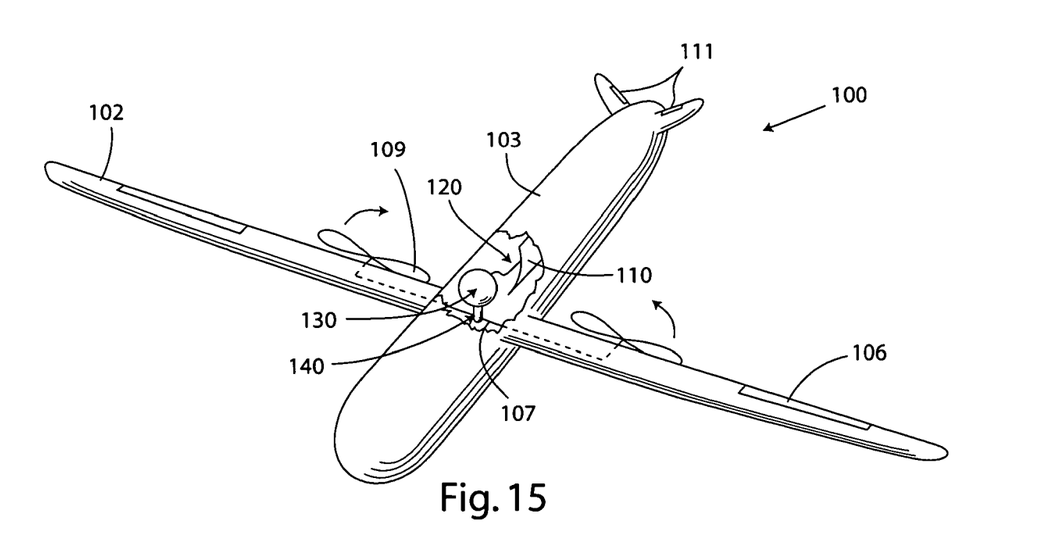
FIG. 15 is a perspective view of single engine/twin pusher propeller solar thermal aircraft.
Figure 17:
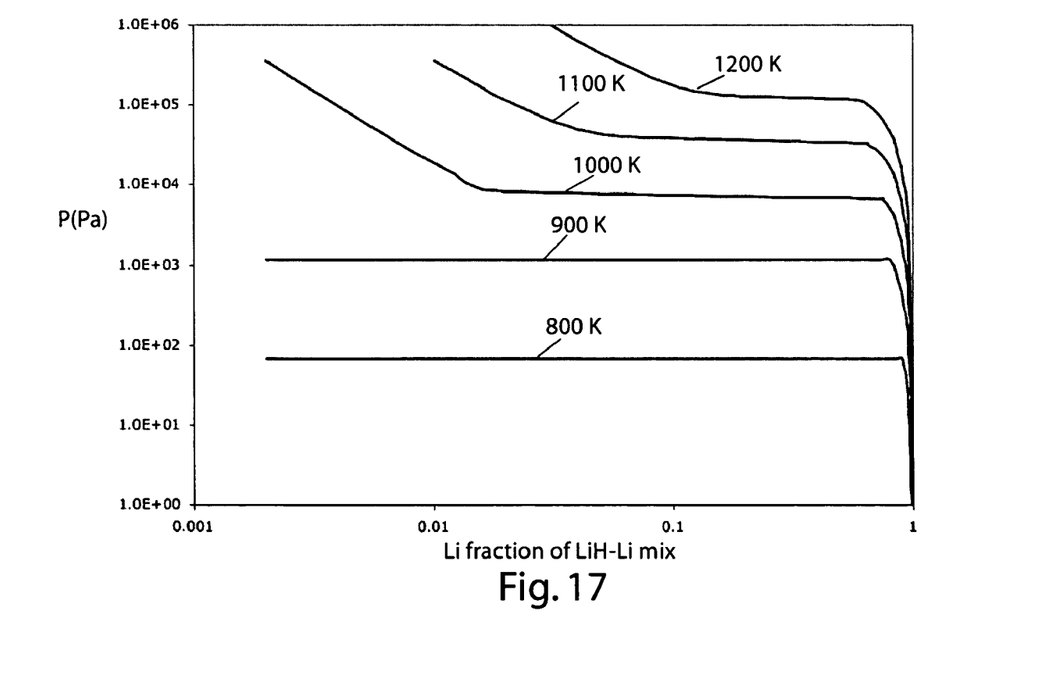
FIG. 17 is a graph of hydrogen vapor pressure in equilibrium with LiH—Li mixture.

Turning now to the drawings, FIGS. 1 and 2 show an exemplary embodiment of the aircraft of the present invention, generally indicated at reference character 100. The aircraft 100 is shown having a conventional fixed-wing airplane body configuration comprising a fuselage 103, and wings 102 and horizontal and vertical stabilizing fins extending from the fuselage. As used herein and in the claims, the term "aircraft body" generally includes the fuselage, the wings, and the horizontal and vertical stabilizing fins, among other structural components connected to and extending from the fuselage. Additionally, attitude control is provided by rudder 104, elevators 105 (or a ruddervator 111 shown in FIG. 15) and ailerons 106. And a propulsion device, such as a propeller 109 in FIG. 1, is coupled to an engine, such as heat engine 140 to propel the aircraft, and thereby produce lift and sustain free flight of the aircraft. Exemplary alternative embodiments of the aircraft body are shown in FIGS. 14, 15 and 17 discussed in greater detail below.

FIGS. 1 and 2 also show the solar thermal power plant of the aircraft 100 generally positioned in the interior of the aircraft body, namely the fuselage 103. The solar thermal power plant includes a heat engine 140, heat storage means i.e. a thermal battery 130 including a heat storage container and medium, a solar tracking concentrator 110, and a heat collection/transport conduit, device, or other means 120. The heat engine 140 is shown mounted in the fuselage 103 at a forward end, with the thermal battery 130 (and in particular the heat storage medium) in thermal contact with a hot side of the heat engine. Due to its internal location, a cooling air inlet channel 108 may be provided to direct ambient air backwash from the propeller 109 to a cold side of the heat engine for cooling. An alternative exemplary embodiment shown in FIG. 18 comprises a rear mount of a heat engine 140, with ambient air sucked past cooling fins 141 by a rearward mounted ducted fan 150. The solar tracking concentrator 110 is movably mounted for actuation in an optically transparent section 112 of the aircraft body, shown in FIG. 2 as a section of the fuselage 103. The optically transparent section 112 has a fuselage skin which is made of an optically transparent, ultraviolet resistant, lightweight material, such as TEDLAR from DuPont, that allows most of the incident solar energy to be transmitted therethrough and to the solar concentrator 110.

Solar Tracking Concentrator

Figure 3:
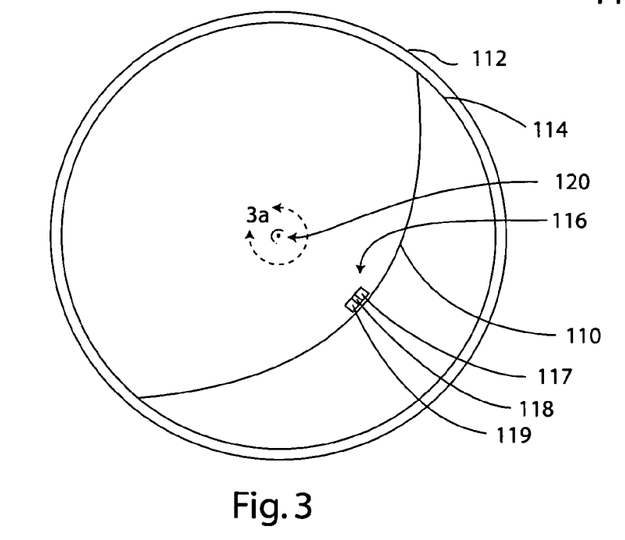
FIG. 3 is a cross-sectional view of the solar thermal aircraft fuselage taken along the line 3—3 of FIG. 2.

FIGS. 2 and 3 show the solar concentrator, i.e. the concentrator mirror 110, in the preferred form of a parabolic trough-shaped reflector, which is movably mounted to a support structure 114 connected to the fuselage. In particular, the concentrator mirror is mounted so as to freely rotate about a rotational axis, which is preferably a focal axis of the parabolic trough reflector. Furthermore, the rotational axis may also be located to be coaxial with the central axis of the fuselage. In any case, the concentrator mirror may be made of a lightweight, thin plastic film, for example, stretched over a skeleton array of formers and coated with a thin layer of highly reflective metal, such as gold or silver. And the solar concentrator support structure 114 is preferably a space frame that allows most of the incident solar flux to be transmitted to the concentrator mirror 110. The entire solar concentrator assembly is balanced, so that no torque is required to hold a particular orientation.

Rotational control of the solar concentrator is provided by a solar tracking device or means including a device or means for determining whether the solar concentrator is optimally aligned with the sun, and a device or means for actuating, e.g. rotating, the solar concentrator mirror into optimal alignment with the sun based on the optimal alignment determination. As used herein and in the claims, "optimal alignment" is that alignment and angle producing the highest concentration of solar flux, i.e. a position "directly facing" the sun. The actuation device or means may comprise, for example, a drive motor 115 (FIG. 2) mounted on the rotational axis of the solar concentrator assembly. And the device or means utilized for determining optimal alignment may be a heliostat 116 adapted to determine the alignment of the sun with respect to the focal axis of the concentrator mirror 110 and operably connected to the drive motor 115 to control the rotational actuation of the solar concentrator. In particular, the heliostat is adapted to detect a shadow of a heat collection and transport element (heat pipe) along the focal axis for use in the optimal alignment determination. The heliostat 116 is shown in FIG. 2 mounted on the concentrator mirror, and in particular, along a symmetric plane of the reflective parabolic trough. The heliostat 116 includes sensing elements which are preferably solar cells (e.g. 117–119) and which are preferably symmetrically arranged about the symmetric plane of the concentrator mirror 110. In a preferred embodiment, the solar cells include a center cell 118, and two outer cells 117, and 119 on opposite sides of the center cell.

Figure 11:
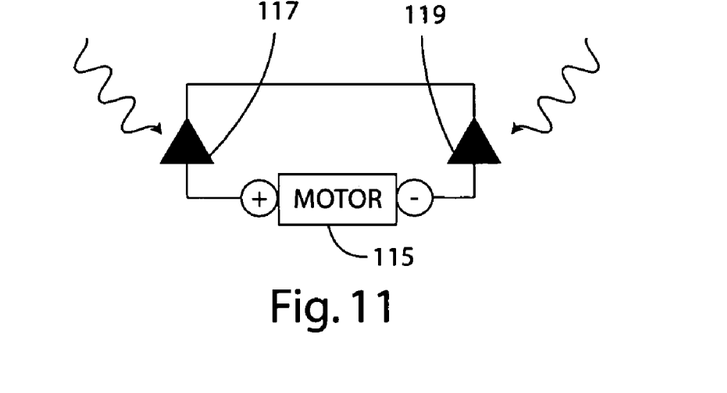
FIG. 11 is a heliostat circuit diagram for sun-tracking mode.
Figure 12:
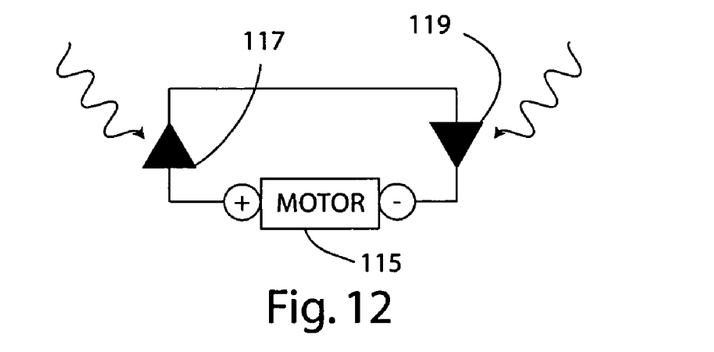
FIG. 12 is a heliostat circuit diagram for sun-searching mode.
Figure 13:
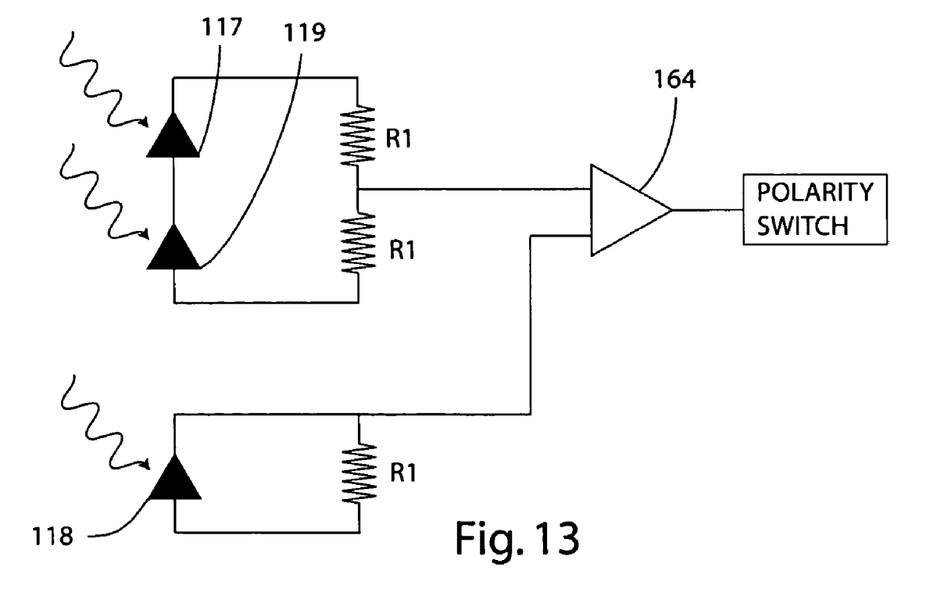
FIG. 13 is a heliostat mode switching circuit diagram.

A preferred method of heliostat operation uses the one center and two outer solar cells in a closed loop feedback stabilization system involving two modes of operation: a sun-searching mode, and a sun-tracking mode, shown in FIGS. 11–13. First, in the sun-tracking mode, the sun is already aligned with the symmetric plane of the reflective parabolic trough, and deviations from alignment are detected. When the solar concentrator is properly, i.e. optimally, aligned to the sun, both outer cells 117,119 of the heliostat 116 are equally illuminated, while the central cell 118 is in the shadow of the back-reflector 113 of the heat collector 120 (or the shadow of the heat collector itself if a back-reflector is not used). As the alignment deviates slightly from the optimal, one of the outer solar cells 117,119 in the heliostat 116 gets a greater solar exposure, while the opposing cell exposure decreases. These sensors feed into a control mechanism (not shown) known in the art, operably connected to the actuating mechanism, e.g. motor 115, for adjustably rotating the solar concentrator 110 on the support structure 114 to maintain optimal alignment of the concentrator mirror to the projected direction to the sun. An example of such a system is shown in FIG. 11. In this figure, the voltage sent to the DC electric motor 115 is the difference of the voltages across the photodiodes 117 and 119, and is proportional to the deviation from the aligned position, and has a nearly linear restoring torque for a certain range of deviations.

In the sun-searching mode, photo-diodes associated with the two outer cells 117 and 119 are connected electrically as shown in FIG. 12. As long as some solar illumination is present, the DC motor 115 produces a driving torque on the solar concentrator structure. Under the condition that no shadow falls on any of the photo-diodes, and they are all equally illuminated, the average voltage of the end photo-diodes (which are driving the motor) is less than the voltage across the central diode. In this case, the output of operational amplifier 164 is low, and the polarity switch is in sun-searching mode. The transition from sun searching mode to sun tracking mode occurs as the shadow of the axial heat collector back-reflector falls onto center photo-diode 118. As the central photo-diode becomes sufficiently shaded, its voltage drops below the average voltage of the outer two photo-diodes 117 and 119. A circuit that exploits this drop in the central diode voltage to change the relative polarity of the diode 117 and 119 connections to the motor 115, is displayed in FIG. 13. As the central diode 118 becomes sufficiently shaded, its voltage drops, and the output of the operational amplifier goes high, thus triggering the sun-tracking mode. Friction of the mechanical structure serves to damp oscillations about the properly aligned orientation.

It is appreciated that sun-searching mode is required at sunrise once per day, and also each time the aircraft heading becomes very close to the projected direction to the sun, and the heliostat is not sufficiently illuminated to maintain sun-tracking. Additionally, the solar cell sensors are adapted to provide power to directly drive the axial rotation actuator, i.e. DC motor 115, and no external power source is required. In this manner, the mass and complexity required for the heliostat system are greatly reduced.

Heat Collection and Transport Element (Heat Pipe)

Figure 3A:
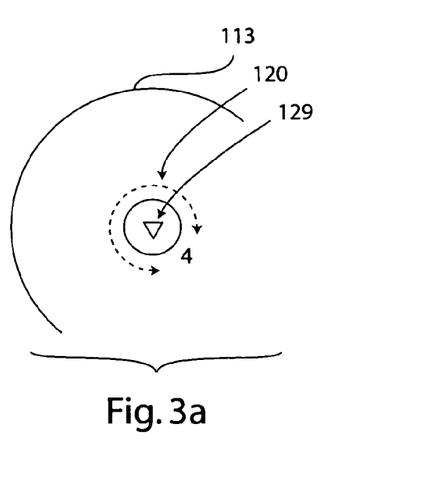
FIG. 3a is an enlarged cross-sectional view of the heat collection element and back-reflector enclosed in circle 3a of FIG. 3.
Figure 4:
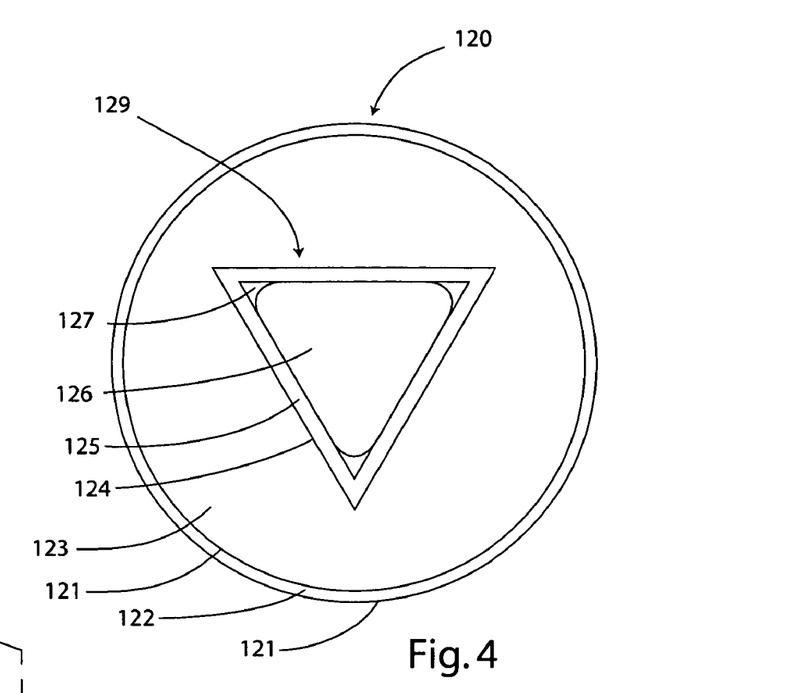

Once the parabolic trough reflector 110 is aligned to the sun, solar radiance is focused onto the center of a heat collector 120 shown best in FIGS. 2 and 3 as being located along the focal axis of the parabolic trough reflector 110 (shown also as the central axis of the fuselage 103). As shown in FIGS. 3a and 4, the heat collector 120 includes a central heat pipe 129 and a heat collector envelope 122, which is a transparent vacuum vessel that allows focused sunlight to transmit to the central heat pipe 129. In a preferred embodiment, the envelope material is fused silica, by virtue of its high transparency, high strength, and tolerance to high temperature. The transparent heat collector envelope 122 is constructed to support a sufficiently high vacuum in the evacuated space 123 to prevent significant conductive or convective heat loss from the central heat pipe 129. The heat collector envelope 122 may have an antireflection coating 121 that decreases the transmission loss of sunlight to the central heat pipe, and minimizes radiative heating of the envelope by the hot central heat pipe. As shown in FIG. 4, both an inner surface and an outer surface of the heat collector envelope 122 are coated with the antireflection coating 121.

Figure 5:
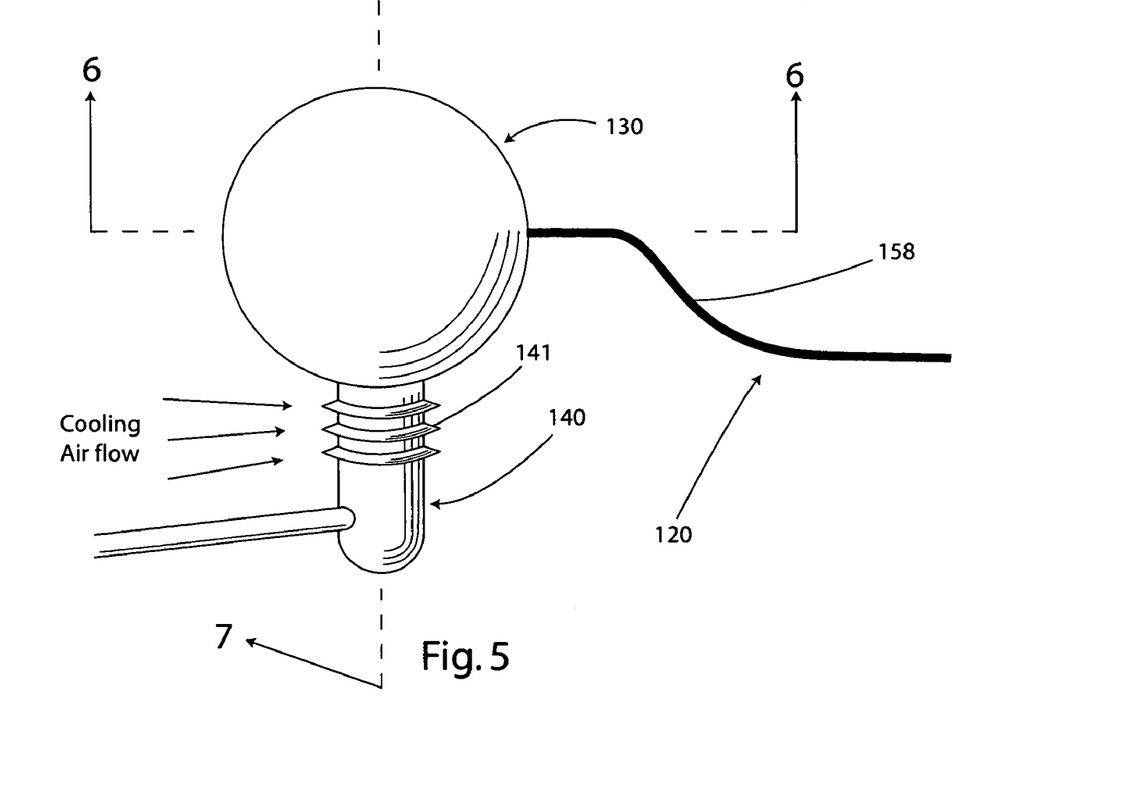
FIG. 5 is a perspective view of the heat storage vessel coupled to a heat engine.
Figures 18, 19, 20:
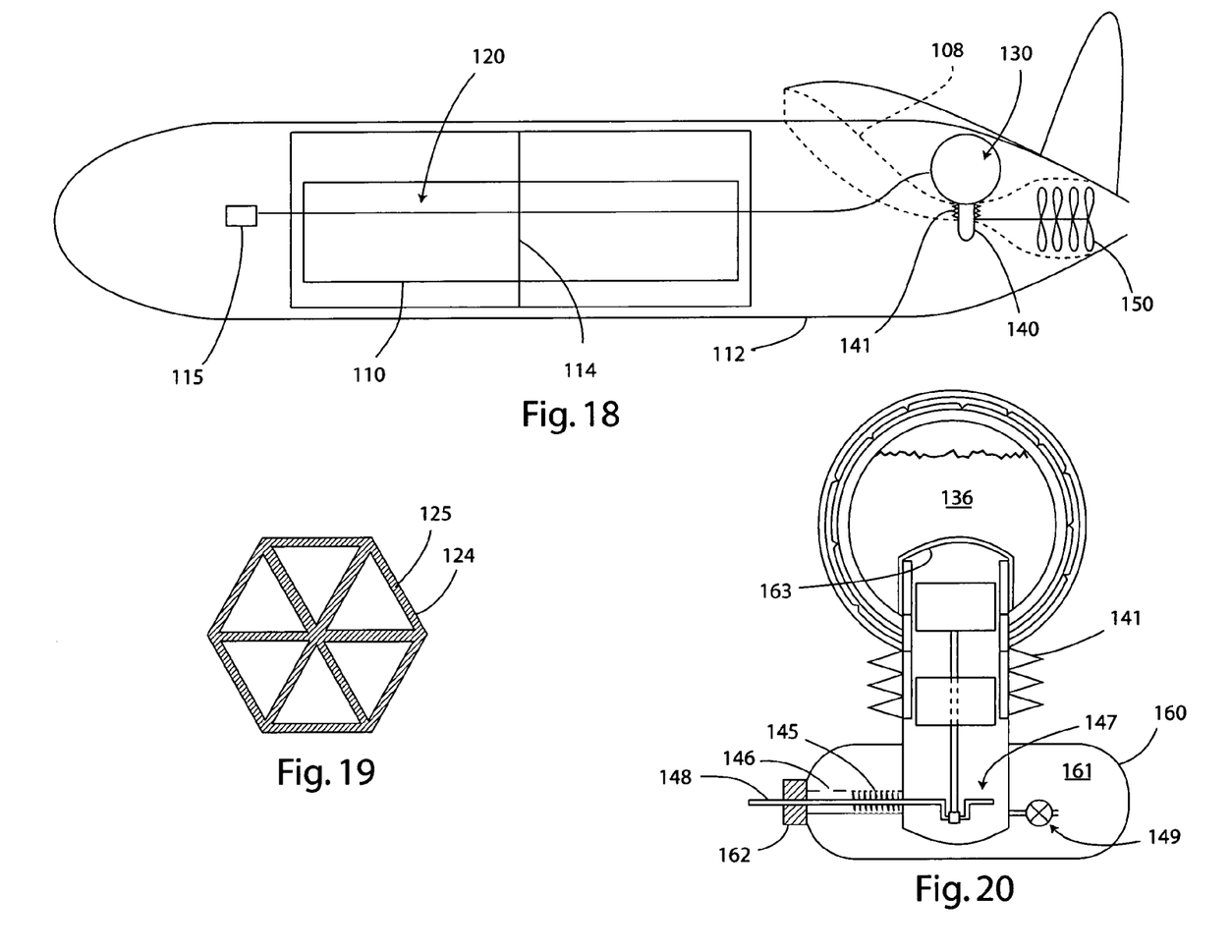
FIG. 18 is a side cross-sectional view of a ducted fan embodiment of the solar thermal powered aircraft.
FIG. 19 is a cross sectional view through an alternative heat pipe embodiment comprising a 6 channel structure.
FIG. 20 is a cross-sectional view of an alternative heat storage vessel and heat engine including a hermetically sealed reservoir of working fluid.

As shown in FIG. 4, the heat pipe 129 preferably has a triangular micro-heat pipe structure 129 with a single triangular channel, which configuration is especially suited for small aircraft applications. For larger aircraft applications, however, heat pipes having a network of multiple capillary channels in parallel are preferred. An example of the multiple capillary channel configuration is shown in FIG. 19, illustrating a close packed assembly of six parallel channels each having a triangular cross-section. The heat pipe 129 contains a heat transfer working fluid that operates to collect solar energy and transport heat to the heat storage medium and/or heat engine (see FIGS. 5 and 6). The heat transfer working fluid is preferably sodium, in both liquid phase 127, shown as a meniscus along the three corners of the triangular heat pipe structure, and vapor phase 126. Alternatively lithium may be utilized as the heat transfer working fluid. In any case, the radius of curvature of the heat pipe working fluid meniscus varies across the length of the heat acceptance region of the heat collector and produces a pressure drop that drives vapor from the hot end of the heat pipe, located along the focal axis of the solar concentrator, to a sodium condenser 128 located inside the thermal battery 130. A corresponding return flow of liquid sodium drains from the condenser into the hot section. This drain is primarily driven by capillary forces, but is also supplemented by gravity in a bend region 158 of the heat pipe illustrated in FIG. 5 and discussed in greater detail below.

The shell 125 of the heat pipe shown in FIG. 4 is preferably constructed of high strength, high temperature material, such as stainless steel, with an outer coating 124 that absorbs sunlight very efficiently, while at the same time having relatively low thermal emissivity. According to the reference: "Reducing the Cost of Energy from Parabolic Trough Solar Power Plants: Preprint", by H. Price and D. Kearney, available from the National Technical Information Service, report number NREL/CP-550-33208, published in January 2003, and incorporated herein by reference, an envelope solar transmittance of 96%, a coating solar absorptance of 94.1%, and a coating thermal emittance of 9.1% have been shown to be practical for solar energy collection systems. Assuming these values for the optical properties of the collection element, the efficiency for operation of the heat pipe at 1150 K, near the boiling point of sodium would be approximately 85% for an equilateral triangle cross section heat pipe 129 having a base width equal to 0.35% of the aperture of the concentrator mirror 110.

With the addition of a highly reflective, semi-circular back-reflector 113, shown in FIG. 3a, this efficiency increases to approximately 90%. The back-reflector is positioned adjacent the heat collector 120 at a side opposite the parabolic trough and preferably rotatably mounted to the solar concentrator support structure 114 together with the solar concentrator. In the preferred embodiment, the back-reflector 113 has a semi-circular cross-section that is concentric to the heat pipe, and thus much of the thermal radiation from the heat pipe emitted in the direction away from the concentrator mirror is not lost, but is instead reflected back and refocused onto the heat pipe. Heat pipes having diameters significantly greater than 0.35% of the concentrator aperture absorb somewhat more power, but have greater radiating surface area and are thus less efficient. Heat pipes having diameters significantly less than 0.35% of the concentrator aperture are significantly smaller than the projected image of the sun on their surface, and thus have low collection efficiency. The efficiency of 90% with the back-reflector 113 represents the fraction of the solar energy incident on the concentrator mirror that is realized as heat to the hot side of the heat engine and is available for thermal storage. The solar collection coating 124 extends only over the portion of the heat pipe that is illuminated by the solar concentrator. For the interval between the end of the solar absorption region and the thermal battery, the heat pipe outer surface is high reflectively material, such as gold. This reduces the thermal emission from the heat pipe in regions where it is not designed to be collecting solar energy.

The fabrication methods for the heat collector 120 are well known to those skilled in the art of electronic vacuum tube fabrication. Indeed, the overall structure is similar to a long cylindrical "light bulb", consisting of a transparent envelope with a central high temperature "filament", i.e. the heat pipe 129. As is well known in the art, such vacuum vessels can maintain a vacuum of sufficient quality to maintain thermal insulation between the filament and the glass envelope for years. A getter, such as titanium, (not shown) may be deposited on the inside of the heat collector envelope in the section between the solar concentrator region and the thermal battery in order to help maintain the requisite vacuum quality, and yet not degrade the heat collection efficiency.

Thermal Diode Action of Heat Pipe

Since the heat transport mechanism in the heat pipe 129 is predominantly driven by capillary action when sunlit, a gentle bend in the heat collector 120 may be employed for the convenience of coupling the heat collector 120 to the thermal battery 130. Moreover, a bend such as downward sloping bend 158 in FIG. 5 between the thermal battery 130 and the solar concentrator 110, also provides a "thermal diode" action for the heat pipe. The downward slope in the bend 158 away from the thermal battery 130 serves as a "drain" for the heat pipe working fluid during dark periods. Since the heliostat device acts autonomously to maintain the solar concentrator pointed at the sun whenever sunlight is available; during sunlit hours the sodium, for example, in the heat pipe remains active as a heat transfer medium. During periods of extended darkness, sodium in remote regions of the heat pipe from the thermal battery 130 will liquefy and then solidify. Liquid sodium will drain out of the thermal battery 130 by gravity down the bend 158 in the heat pipe 120. Eventually, almost all of the sodium will be frozen in regions of the heat pipe below the bend region 158. The remaining thermal connection out of the thermal battery is the thin stainless steel heat pipe shell, and the thin glass envelope, neither of which have significant thermal conductivity. In this fashion, the heat pipe acts as a thermal diode to prevent significant loss of heat from the thermal battery during periods of extended darkness, as at night, or during extended periods of heavy cloud cover, while having very high heat transport efficiency during sunlit periods.

Thermal Battery Container

Figures 6, 9:
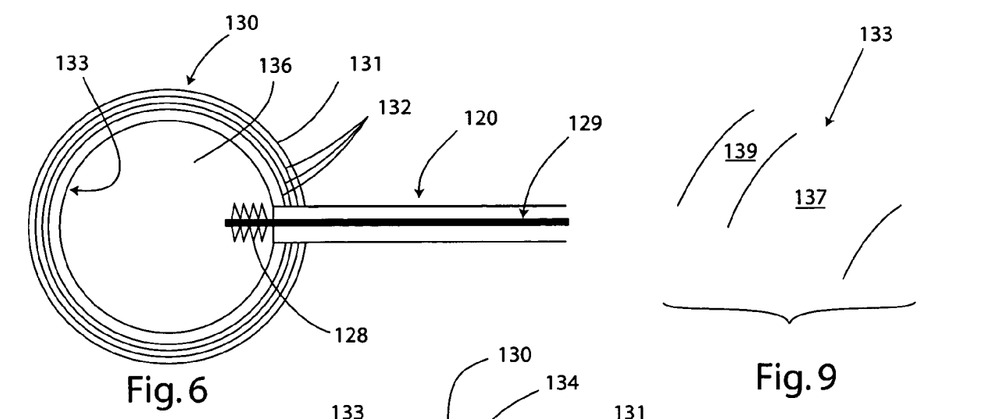
FIG. 6 is a cross-sectional view of the heat storage vessel taken along the line 6—6 of FIG. 5.
FIG. 9 is an enlarged cross-sectional view of the lithium hydride containment shell structure.
Figures 7, 10:
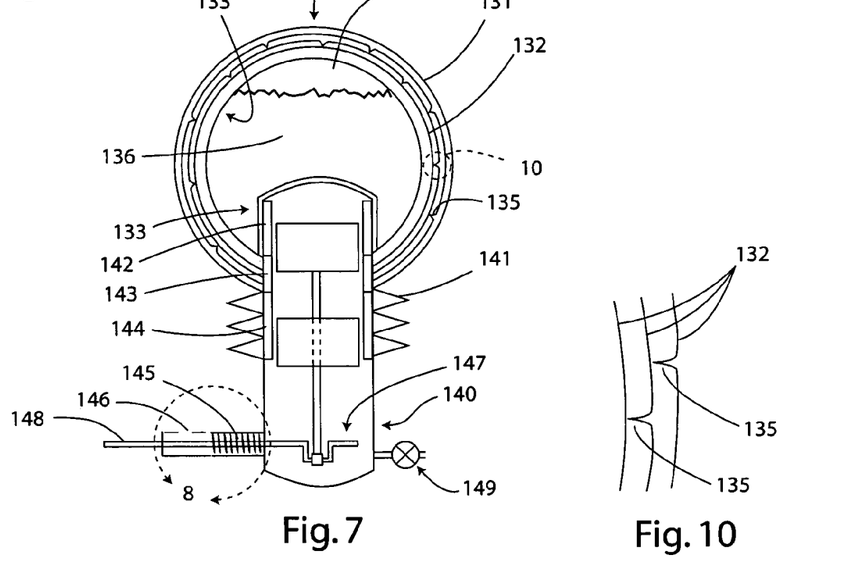
FIG. 7 is a cross-sectional view of the heat storage vessel and the heat engine taken along the line 7—7 of FIG. 5.
FIG. 10 is an enlarged cross-sectional view of the multi-layer insulation structure.
Figure 8:
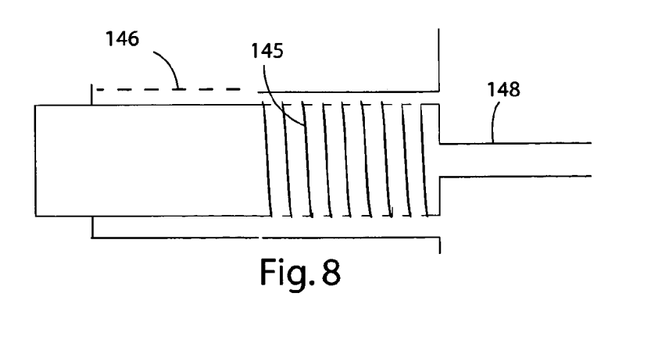
FIG. 8 is an enlarged cross-sectional view of the crankshaft pumping structure enclosed in the circle 8 of FIG. 7.

As previously mentioned and further shown in FIGS. 6 and 7, the thermal battery 130 includes (1) a heat storage container comprising layers 131, 132,133 and (2) a heat storage medium, i.e. thermal battery core 136 contained in the heat storage container. With respect to the heat storage container, i.e. thermal battery container, it includes several layers of thin, highly reflective material 132, separated by spacers 135, and a highly reflective outer vacuum vessel 131, surround a containment shell structure 133. As shown in FIG. 9, the containment shell structure 133 is further comprised of a primary containment shell 137 and a gold layer 139, described in detail below. The layers of highly reflective material act as radiation shields, and provide thermal insulation of the hot thermal battery core 136. The spacers 135 separating the multiple layers of reflective material in the preferred embodiment are simply pointed dimples in the reflective material, having very little mass, and providing very little thermal contact between layers. The vessel 131 is evacuated to prevent conductive or convective degradation of the thermal insulation. A certain quantity of getter material, such as titanium, (not shown) may be deposited on the interior of the vacuum vessel 131 in order to maintain sufficiently high vacuum quality that the thermal insulation quality of the multi-layer insulation is preserved. As is well known to the person of ordinary skill in the art, for such a multi-layer insulation structure, designed to have negligible conductive and convective thermal loss, for a reflective material having an emissivity of 0.03 (as is typical of goal coatings) in a total of 15 layers, and an inner temperature of 1200 K, the effective thermal emissivity is 0.001, and the radiative cooling power loss rate is approximately only 120 W/m$^2$.

Thermal Battery Core

With respect to the heat storage medium, i.e. thermal battery core 136 contained by the thermal battery container, the utility of LiH as a thermal energy storage medium was previously discussed in the Background, and is due to the very high thermal energy per unit mass characteristic of LiH. However, in order to address the problem of lithium-hydride containment for high temperatures, e.g. 700° C. and above, a small admixture of lithium is utilized in order to prevent a hydrogen explosion. Thus the heat storage medium, i.e. the thermal battery core 136, consists of a mixture of lithium hydride and lithium metal, in equilibrium with various dissociation products 134, including hydrogen gas and liquid phase lithium and lithium hydride. The most significant contribution to the total vapor pressure is the partial pressure of hydrogen. The equilibrium hydrogen pressure is a function of both the temperature and the fraction of Li in a LiH—Li mixture, as is displayed in FIG. 17. Theoretically, pure LiH has an infinite hydrogen vapor pressure just above the melting point of LiH. It is therefore necessary either to provide a certain small quantity of Li along with the LiH in the thermal battery core, or to allow some hydrogen to permeate out of the container prior to final sealing.

The fabrication of the LiH and Li mixture may be achieved by starting with an initially pure quantity of LiH in the thermal battery fabrication process, and after initial hermetic sealing of the LiH in its primary containment shell 137, consisting of a LiH—Li impervious alloy, test the quality of the seal by heating the LiH to just below the melting point. Some possible alloys that are relatively inert to Li are Mo—Z, Mo—Re, and Nb—Zr, as described in "High Temperature Liquid Metal Heat Pipes", by A. Bricard, T. Claret, P. Lecocq and T. Alleau, in the Proceedings of the 7$^{th}$ International Heat Pipe Conference, (1993), incorporated by reference herein. In addition, very low carbon steel is also inert to Li and LiH. According to the reference: "Compatibility of potential containment materials with molten lithium hydride at 800° C.", by S. J. Pawel, published in the Journal of Nuclear Materials vol. 207, pp. 136–152, in 1993, also incorporated herein by reference, "Stabilized (Nb and Ti) low carbon (<0.06%) steels are observed to be essentially inert in LiH at 800° C. with stable carbides and no grain growth." The initial "seal test" heating step causes a significant pressure of hydrogen to build up in the LiH container. If the seal is bad, a relatively high hydrogen pressure will be observed. In contrast, if the container is well sealed, a much lower hydrogen pressure will still be seen outside the container, due only to hydrogen permeation. After a small quantity of hydrogen has been allowed to permeate out of the container, the LiH may be slowly raised (in order to avoid an excessive pressure spike) above the melting point, and sufficient hydrogen removed by permeation to bring the Li metal fraction remaining in the core 136 up to a desirable value.

As an example, by getting to a 2% Li metal mixture, the hydrogen pressure at a working temperature of 1100 K will be just over one atmosphere, as can be read from the plot in FIG. 17. Once the desired LiH—Li mix has been reached, heating may be ended, and the LiH container allowed to cool. In order to prevent further significant hydrogen permeation, the inner LiH containment shell is coated with a gold layer 139. The outermost layer of gold 139 provides a permeation barrier to the evolution of hydrogen. A gold layer of approximately 0.001" is estimated to yield a hydrogen containment lifetime of over a year. Gold has the additional advantage of having low thermal emissivity (approximately 3%), and thus provides for low thermal radiative cooling loss through the muti-layer thermal insulation.

Inner cavities inside the thermal battery 130 provide good thermal contact to both the sodium condenser 128 at the end of the heat pipe 129, as illustrated in FIG. 6. The external surface of the sodium condenser 128 is primarily cooled by hydrogen "boiling" as the LiH dissociates. Hydrogen bubbles rise to the vapor space, with some hydrogen-lithium recombination occurring in the liquid phase 136, and some recombination occurring in the vapor phase 134, until equilibrium is reached. The sodium condenser is sufficiently large to assure that the heat flux through the sodium condenser 128 into the thermal battery is below the critical heat flux marking the onset of so-called "transition" boiling, and thus maintains a high heat transfer efficiency.

Heat Engine

Figure 16:
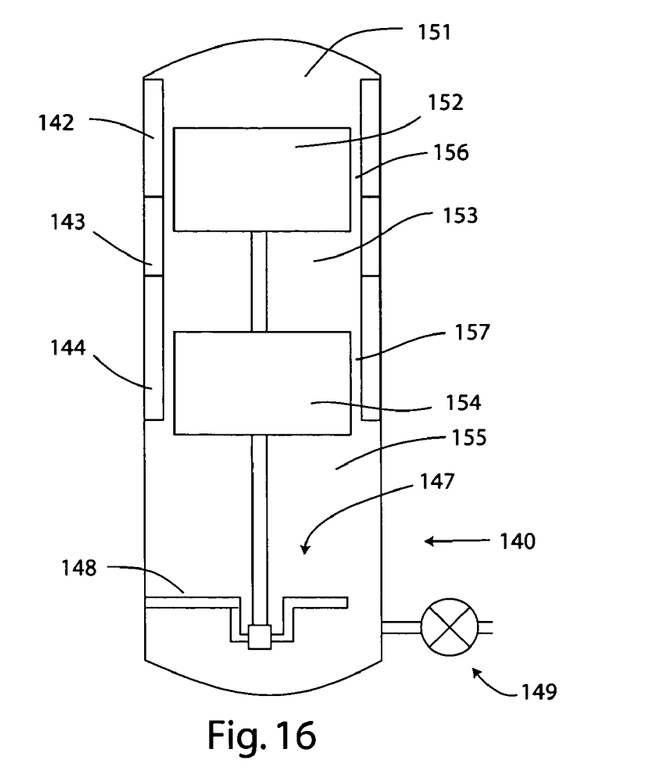
FIG. 16 is a cross-sectional view of a Stirling engine.

FIG. 16 illustrates a Stirling engine of the beta form, well known to practitioners in the art of heat engines, which serves as a preferred embodiment of the heat engine 140. Generally, a crank mechanism 147 converts the reciprocating motion of the Stirling engine to rotary motion of a propeller by a crankshaft 148, as is well known to those skilled in the art. The Stirling engine has a hot side and a cold side, represented by a hot side heat exchanger 142 and a cold side heat exchanger 144, respectively. The Stirling engine mechanism forces a working fluid, such as for example air or helium hermetically sealed therein, to cyclically pass from the expansion space 151 through the hot side heat exchanger 142, the regenerator 143, the cold side heat exchanger 144, the compression space 153, and back. The working fluid goes through a pressure cycle that is phased to deliver net power over the course of a cycle, through the power piston 154 to the crankshaft 148. The phase of the variation of the compression space volume 153 relative to the expansion space volume 151 is approximately 90°. The gap 156 around the displacer piston is sufficiently large that only an insignificant pressure drop is developed between the expansion space 151 and the compression space 153. In contrast, the gap 157 around the power piston is sufficiently small that almost no working fluid between the compression space 153 and the crankcase space 155. Still, over many cycles, sufficient working fluid does flow through the power piston gap 157 that equilibrium is reached between the average pressure in the compression space 153 and the average pressure in the crankcase space 155.

As illustrated in FIG. 7, the thermal battery 130 generally and the heat storage medium in particular, e.g. the LiH/Li mixture, is in thermal contact with the hot side of the heat engine 140 for supplying heat thereto from the stored heat transported by the heat collection and transporting conduit, i.e. heat pipe 120. The hot side heat exchanger 142 is primarily heated by conduction from the hot liquid phase 136 through the thin container wall 133. Waste heat is removed from the cold side heat exchanger 144 of the heat engine 140 by forced convective cooling provided by ambient air flowing in through the inlet channel 108 past a set of cooling fins 141. Since the air temperature at high altitude is very low, approximately 220 K between 10 km and 40 km, the cold side of the heat engine can be held relatively cool, and the resulting Carnot heat engine efficiency may exceed 70%. Achieving such efficiency is aided by the design of the air cooling channel 108 shown in FIG. 2. The cool air forced past the cooling fins 141 may be driven by the airflow past the aircraft, a forward propeller 109 or a rearward ducted fan 150. As displayed in FIG. 7, the full length of the hot side heat exchanger 142 lies within the thermal battery core, while the full span of the regenerator 143 extends across the gap between the thermal battery core and the outer vacuum vessel wall, and the cold side heat exchanger 144 lies within the range of the cooling fins 141. This arrangement maximizes the thermal contact to both the hot and cold thermal reservoirs, and produces a nearly linear temperature gradient across the regenerator.

Stirling Engine Power Modulation

The power produced by the Stirling engine tends to increase with the mean pressure in the expansion space 151 inside the engine. Thus, venting the engine crankcase, through the crankcase pressure relief valve 149 shown in FIG. 7, to the ambient air, for example, serves to decrease the output power. Correspondingly, increasing the crankcase pressure serves to increase the output power.

Pressurization of the crankcase above the ambient atmospheric pressure is preferably achieved by the action of a crankshaft pump 145 that produces a pumping action as the crankshaft rotates, to self-pressurize the crankcase. The crankshaft pump 145 comprises at least one helical groove on either the crankshaft surface or a journal surrounding the crankshaft. It is appreciated that one or more helical grooves may be utilized in the same direction for greater pumping performance. And a filter 146 prevents particulate contamination in the working fluid from clogging the passageways in the crankshaft pump 145.

In the preferred embodiment, the crankcase pressurizes to a value determined by the pressure drop across the crankshaft pump and the outside atmospheric pressure, for the case that the working fluid is simply ambient air. This pressure drop is in turn determined by the design of the grooves, both in terms of the number of grooves, and the groove shape. The steady state speed of the crankshaft pump is designed to produce a given mean operating pressure inside the crankcase of the engine. A pressure drop of one atmosphere across the crankcase pump, for example, produces an operating pressure that is relatively insensitive to the operating altitude of the aircraft. At an altitude corresponding to 10% of atmospheric pressure, the engine operating pressure would be approximately 50% that corresponding to sea level.

An alternative embodiment is shown in FIG. 20 using helium as the working fluid in the Stirling engine, includes a closed and sealed reservoir 160 (the working fluid pressure vessel) serving to contain helium that is vented from the crankcase pressure relief valve 149, and return the released helium to the crankshaft pump 145 in a closed cycle through a filter 146. The pressure of the helium in the sealed chamber is much less than the engine operating pressure, and thus the outer crankshaft journal bearing 162 may readily act as a gas tight seal to prevent significant loss of helium to the ambient air. In another embodiment, the working fluid may be hydrogen, and in addition, a hydrogen permeable cap 163 (even high temperature steel will be adequate to this end under many circumstances) may be used on the hot end of the Stirling engine. In this case, the slow loss of hydrogen from the thermal battery core 136 may be balanced by a slow gain from the Stirling engine hydrogen working fluid through the end cap 163, thereby extending the hydrogen containment lifetime of the thermal battery to an arbitrary degree.

Alternative Configurations

And FIGS. 14, 15, and 18 show alternative arrangements of the solar thermal power plants for aircraft of various configurations. FIG. 14 illustrates the aircraft 100 having two solar power plants, one on each wing 102 of the aircraft. In particular, FIG. 14 shows multiple wing-mounted solar energy collection and storage systems directly coupled to a corresponding wing-mounted heat engine. Thus each solar power plant of each wing is self-sustainable and independently operable. FIG. 15 shows a fuselage-mounted solar energy collection and storage system with a multiplicity of wing mounted propellers driven by a transmission system 107. It is appreciated that the propellers may be arranged to push the aircraft, as specifically shown in FIG. 15, or alternatively to pull the aircraft (not shown). And FIG. 18 shows a fuselage-mounted solar energy collection and storage system with a stern mounted ducted fan propulsion system 150. As shown, the heat engine 140 and cooling fins 141 in particular are cooled via an air inlet 108 that also serves to supply airflow to the ducted fan propulsion system.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

I claim:

1. An aircraft powered by the heat of the sun comprising:
an aircraft body capable of producing lift and sustained free flight when propelled;
heat engine means carried by said aircraft body for producing power;
propulsion means powered by said heat engine means for propelling said aircraft;
heat storage means in thermal contact with said heat engine means for supplying heat thereto;
solar concentration means movably connected to said aircraft body for receiving and concentrating solar energy;
solar tracking means including means for determining whether said solar concentration means is optimally aligned with the sun, and means for actuating said solar concentration means into optimal alignment with the sun based on said determination; and
heat collection/transport means for collecting the concentrated solar energy and transporting heat to said heat storage means,
wherein said aircraft body includes an optically transparent section, and said solar concentration means is movably mounted in said optically transparent section so that incident solar flux is transmitted therethrough to said solar concentration means, and wherein said solar concentration means is a reflective parabolic trough for concentrating solar energy along a focal axis thereof and adapted to rotate about said focal axis, and said heat collection/transport means is positioned along said focal axis to collect the concentrated solar energy.

2. The aircraft of claim 1,
wherein said optically transparent section is on a fuselage of said aircraft body.

3. The aircraft of claim 1,
wherein said optically transparent section is on a wing of said aircraft body.

4. The aircraft of claim 1,
wherein said means for determining optimal alignment comprises a heliostat mounted on said reflective parabolic trough for rotation therewith about said focal axis.

5. The aircraft of claim 4,
wherein said heliostat is located along a symmetric plane of said reflective parabolic trough and adapted to detect a shadow of said heat collection/transport means for use in the optimal alignment determination.

6. The aircraft of claim 5,
wherein said heliostat includes solar cells symmetrically arranged about said symmetric plane.

7. The aircraft of claim 6,
wherein said solar cells include a center cell, and two outer cells on opposite sides of the center cell.

8. The aircraft of claim 7,
wherein, in a sun tracking mode, said heliostat is adapted to detect deviations from optimal alignment of said reflective parabolic trough by detecting voltage differences between said two outer cells.

9. The aircraft of claim 7,
wherein, in a sun searching mode, said heliostat is adapted to locate the position of the sun by detecting the voltage difference between the center cell and the average of the two outer cells.

10. The aircraft of claim 6,
wherein the solar cells of said heliostat provide power to said actuation means to rotate said reflective parabolic trough into optimal alignment with the sun.

11. The aircraft of claim 1,
wherein said heat collection/transport means comprises a heat pipe containing a heat transfer working fluid and connected at one end to said heat storage means.

12. The aircraft of claim 11,
wherein said heat pipe has a triangular cross-section forming a single channel containing the heat transfer working fluid.

13. The aircraft of claim 11,
wherein said heat pipe comprises multiple channels in parallel containing the heat transfer working fluid.

14. The aircraft of claim 13,
wherein said multiple channels each have a triangular cross-section.

15. The aircraft of claim 11,
wherein said heat collection/transport means further comprises an optically transparent heat collector envelope coaxially surrounding said heat pipe and supporting a vacuum therebetween, said heat collector envelope allowing concentrated solar energy to be transmitted to said heat pipe while substantially inhibiting conductive and convective heat loss therefrom.

16. The aircraft of claim 15,
wherein said heat collector envelope has an anti-reflection coating that decreases the transmission loss of sunlight to said heat pipe, and minimizes radiative heating of said heat collector envelope by said heat pipe.

17. The aircraft of claim 11,
wherein said heat pipe contains sodium as the heat transfer working fluid.

18. The aircraft of claim 11,
wherein said heat pipe contains lithium as the heat transfer working fluid.

19. The aircraft of claim 11,
wherein said heat pipe has a bend section which slopes downward away from said heat storage means, for draining the heat transfer working fluid away from said heat storage means during dark periods.

20. The aircraft of claim 11,
further comprising a back-reflector adjacent the heat pipe at a side thereof opposite the reflective parabolic trough, for reflecting radiation from said heat pipe back thereto.

21. The aircraft of claim 20,
wherein said means for determining optimal alignment uses a shadow of said back-reflector for said determination.

22. The aircraft of claim 1,
wherein said heat storage means comprises a thermal container and a mixture of lithium hydride and lithium metal contained therein.

23. The aircraft of claim 22,
wherein said mixture of lithium hydride and lithium metal is in substantial equilibrium with dissociation products, including hydrogen gas, and liquid phase lithium and lithium hydride.

24. The aircraft of claim 22,
wherein said thermal container includes an inner containment shell structure and an outer vacuum shell supporting an evacuated space therebetween.

25. The aircraft of claim 24,
wherein said thermal container includes thermal battery insulation in said evacuated space comprising multiple layers of highly reflective material to shield against radiation.

26. The aircraft of claim 1,
wherein said propulsion means includes at least one propeller operably coupled to said heat engine means to be driven thereby.

27. The aircraft of claim 1,
wherein said propulsion means includes at least one ducted fan system operably coupled to said heat engine means to be driven thereby, and said aircraft body has an air inlet and an air outlet which leads air into and out of said at least one ducted fan system, respectively.

28. The aircraft of claim 27,
wherein said at least ducted fan system is located near a stern end of said aircraft body.

29. The aircraft of claim 27,
wherein said air inlet and said air outlet leads air past a cold side heat exchanger of said heat engine means for convective cooling thereof.

30. The aircraft of claim 1,
wherein said heat engine means comprises at least two heat engines.

31. The aircraft of claim 30,
wherein each of said heat engines is independently powered by and associated with a corresponding heat storage means, solar concentration means, solar tracking means, and heat collection/transport means.

32. A solar thermal powered aircraft comprising:
an aircraft fuselage;
wing means extending from said aircraft fuselage and capable of producing lift and sustained free flight when propelled, said wing means having an optically transparent section;
a heat engine for producing power and carried by said aircraft fuselage, said heat engine having a heat storage medium in thermal contact therewith for supplying heat thereto;
at least one propulsion device(s) powered by said heat engine for propelling said aircraft;
a solar concentrator movably mounted in said optically transparent section so that incident solar flux is transmitted therethrough to said solar concentrator for receiving and concentrating solar energy;
a solar tracker adapted to determine whether said solar concentrator is optimally aligned with the sun, and actuate said solar concentrator into optimal alignment with the sun based on said determination, for tracking the position of the sun; and
a heat collection and transporting conduit adapted to collect the concentrated solar energy and transport heat to said heat storage medium.

33. The aircraft of claim 32,
wherein said propulsion device include a propeller operably coupled to said heat engine to be driven thereby.

34. The aircraft of claim 32,
wherein said propulsion device includes a ducted fan system operably coupled to said heat engine to be driven thereby.

35. A solar thermal powered aircraft comprising:
an aircraft fuselage;
wing means extending from said aircraft fuselage and capable of producing lift and sustained free flight when propelled, said wing means having at least two optically-transparent sections; and
associated with each optically-transparent section:
  a heat engine carried by said wing means for producing power, and having a heat storage medium in thermal contact therewith for supplying heat thereto;
  a propulsion device powered by the corresponding heat engine for propelling said aircraft;
  a solar concentrator movably mounted in the corresponding optically transparent section so that incident solar flux is transmitted therethrough to said solar concentrator for receiving and concentrating solar energy;
  a solar tracker adapted to determine whether the corresponding solar concentrator is optimally aligned with the sun and to actuate said solar concentrator into optimal alignment with the sun based on said determination, for tracking the position of the sun; and a heat collection and transporting conduit adapted to collect the concentrated solar energy and transport heat to the corresponding heat storage medium.

36. The aircraft of claim 32 or 35,
wherein said solar concentrator is a reflective parabolic trough for concentrating solar energy along a focal axis thereof and adapted to rotate about said focal axis, and said heat collection and transporting conduit is positioned along said focal axis to collect the concentrated solar energy.

37. The aircraft of claim 36,
wherein said solar tracker includes a heliostat mounted on said reflective parabolic trough for rotation therewith about said focal axis.

38. The aircraft of claim 37,
wherein said heliostat is located along a symmetric plane of said reflective parabolic trough and adapted to detect a shadow of said heat collection and transport conduit for use in the optimal alignment determination.

39. The aircraft of claim 38,
wherein said heliostat includes solar cells symmetrically arranged about said symmetric plane.

40. The aircraft of claim 39,
wherein said solar cells include a center cell, and two outer cells on opposite sides of the center cell.

41. The aircraft of claim 40,
wherein, in a sun tracking mode, said heliostat is adapted to detect deviations from optimal alignment of said reflective parabolic trough by detecting voltage differences between said two outer cells.

42. The aircraft of claim 40,
wherein, in a sun searching mode, said heliostat is adapted to locate the position of the sun by detecting the voltage difference between the center cell and the average of the two outer cells.

43. The aircraft of claim 39,
wherein the solar cells of said heliostat provide power to said actuation means to rotate said reflective parabolic trough into optimal alignment with the sun.

44. The aircraft of claim 36,
wherein said heat collection and transporting conduit comprises a heat pipe containing a heat transfer working fluid and connected at one end to said heat storage medium.

45. The aircraft of claim 44,
wherein said heat pipe has a triangular cross-section forming a single channel containing the heat transfer working fluid.

46. The aircraft of claim 44,
wherein said heat pipe comprises multiple channels in parallel containing the heat transfer working fluid.

47. The aircraft of claim 46,
wherein said multiple channels each have a triangular cross-section.

48. The aircraft of claim 44,
wherein said heat collection and transporting conduit further comprises an optically transparent heat collector envelope coaxially surrounding said heat pipe and supporting a vacuum therebetween, said heat collector envelope allowing concentrated solar energy to be transmitted to said heat pipe while substantially inhibiting conductive and convective heat loss therefrom.

49. The aircraft of claim 48,
wherein said heat collector envelope has an anti-reflection coating that decreases the transmission loss of sunlight to said heat pipe, and minimizes radiative heating of said heat collector envelope by said heat pipe.

50. The aircraft of claim 44,
wherein said heat pipe contains sodium as the heat transfer working fluid.

51. The aircraft of claim 44,
wherein said heat pipe contains lithium as the heat transfer working fluid.

52. The aircraft of claim 44,
wherein said heat pipe has a bend section which slopes downward away from said heat storage medium, for draining the heat transfer working fluid away from said heat storage medium during dark periods.

53. The aircraft of claim 43,
further comprising a back-reflector adjacent the heat pipe at a side thereof opposite the reflective parabolic trough, for reflecting radiation from said heat pipe back thereto.

54. The aircraft of claim 53,
wherein said solar tracker uses a shadow of said back-reflector for said optimal alignment determination.

55. The aircraft of claim 34 or 35,
wherein said heat storage means comprises a thermal container and a mixture of lithium hydride and lithium metal contained therein.

56. The aircraft of claim 55,
wherein said mixture of lithium hydride and lithium metal is in substantial equilibrium with dissociation products, including hydrogen gas, and liquid phase lithium and lithium hydride.

57. The aircraft of claim 55,
wherein said thermal container includes an inner containment shell structure and an outer vacuum shell supporting an evacuated space therebetween.

58. The aircraft of claim 57,
wherein said thermal container includes thermal battery insulation in said evacuated space comprising multiple layers of highly reflective material to shield against radiation.

59. The aircraft of claims 1, 34 or 58,
wherein said heat engine means is a Stirling engine having a hot side heat exchanger and a cold side heat exchanger.

60. The aircraft of claim 59,
wherein said Stirling engine includes at least one helical groove on one of a crankshaft and a journal surrounding said crankshaft, for self-pressurizing said Stirling engine.

61. The aircraft of claim 60,
wherein said Stirling engine includes a crankcase pressure relief valve for controlling the crankcase pressure and the power output of said Stirling engine.

62. The aircraft of claim 60,
wherein said Stirling engine is hermetically sealed and uses helium as the working fluid therein.

63. The aircraft of claim 62,
wherein said Stirling engine includes a crankcase pressure relief valve for controlling the crankcase pressure and the power output of said Stirling engine, and a sealed chamber connected to said crankcase pressure relief valve and an intake end of said helical groove, for recycling helium released by said crankcase pressure relief valve.

64. The aircraft of claim 59,
wherein said Stirling engine includes cooling fins adjacent the cold side heat exchanger.

65. The aircraft of claim 64,
wherein said propulsion device include a propeller operably coupled to said heat engine to be driven thereby.

66. The aircraft of claim 64,
wherein said propulsion device includes a ducted fan system operably coupled to said heat engine to be driven thereby.

67. An aircraft powered by the heat of the sun comprising:
an aircraft body capable of producing lift and sustained free flight when propelled;
heat engine means carried by said aircraft body for producing power;
propulsion means powered by said heat engine means for propelling said aircraft;
solar concentration means movably connected to said aircraft body for receiving and concentrating solar energy;
solar tracking means including means for determining whether said solar concentration means is optimally aligned with the sun, and means for actuating said solar concentration means into optimal alignment with the sun based on said determination; and
heat collection/transport means for collecting the concentrated solar energy and transporting heat to said heat engine means,
wherein said aircraft body includes an optically transparent section, and said solar concentration means is movably mounted in said optically transparent section so that incident solar flux is transmitted therethrough to said solar concentration means, and wherein said solar concentration means is a reflective parabolic trough for concentrating solar energy along a focal axis thereof and adapted to rotate about said focal axis, and said heat collection/transport means is positioned along said focal axis to collect the concentrated solar energy.

68. A solar thermal power plant comprising:
a heat engine for producing power;
a heat storage medium in thermal contact with a hot side of said heat engine for supplying heat thereto;
an actuable reflective parabolic trough for receiving and concentrating solar energy along a focal axis thereof and adapted to rotate about said focal axis;
a solar tracker adapted to determine whether said reflective parabolic trough is optimally aligned with the sun and to actuate said reflective parabolic trough into optimal alignment with the sun based on said determination, for tracking the position of the sun; and
a heat collection and transporting conduit positioned along said focal axis and adapted to collect the concentrated solar energy and transport heat to said heat storage medium.

69. The solar thermal power plant of claim 68,
wherein said solar tracker includes a heliostat mounted on said reflective parabolic trough for rotation therewith about said focal axis.

70. The solar thermal power plant of claim 69,
wherein said heliostat is located along a symmetric plane of said reflective parabolic trough and adapted to detect a shadow of said heat collection and transport conduit for use in the optimal alignment determination.

71. The solar thermal power plant of claim 70,
wherein said heliostat includes solar cells symmetrically arranged about said symmetric plane.

72. The solar thermal power plant of claim 71,
wherein said solar cells include a center cell, and two outer cells on opposite sides of the center cell.

73. The solar thermal power plant of claim 72,
wherein, in a sun tracking mode, said heliostat is adapted to detect deviations from optimal alignment of said reflective parabolic trough by detecting voltage differences between said two outer cells.

74. The solar thermal power plant of claim 72,
wherein, in a sun searching mode, said heliostat is adapted to locate the position of the sun by detecting the voltage difference between the center cell and the average of the two outer cells.

75. The solar thermal power plant of claim 71,
wherein the solar cells of said heliostat provide power to said actuation means to rotate said reflective parabolic trough into optimal alignment with the sun.

76. The solar thermal power plant of claim 71,
wherein said heat collection and transporting conduit comprises a heat pipe containing a heat transfer working fluid and connected at one end to said heat storage medium.

77. The solar thermal power plant of claim 76,
wherein said heat pipe has a triangular cross-section forming a single channel containing the heat transfer working fluid.

78. The solar thermal power plant of claim 76,
wherein said heat pipe comprises multiple channels in parallel containing the heat transfer working fluid.

79. The solar thermal power plant of claim 78,
wherein said multiple channels each have a triangular cross-section.

80. The solar thermal power plant of claim 76,
wherein said heat collection and transporting conduit further comprises an optically transparent heat collector envelope coaxially surrounding said heat pipe and supporting a vacuum therebetween, said heat collector envelope allowing concentrated solar energy to be transmitted to said heat pipe while substantially inhibiting conductive and convective heat loss therefrom.

81. The solar thermal power plant of claim 80,
wherein said heat collector envelope has an anti-reflection coating that decreases the transmission loss of sunlight to said heat pipe, and minimizes radiative heating of said heat collector envelope by said heat pipe.

82. The solar thermal power plant of claim 76,
wherein said heat pipe contains sodium as the heat transfer working fluid.

83. The solar thermal power plant of claim 76,
wherein said heat pipe contains lithium as the heat transfer working fluid.

84. The solar thermal power plant of claim 76,
wherein said heat pipe has a bend section which slopes downward away from said heat storage medium, for draining the heat transfer working fluid away from said heat storage medium during dark periods.

85. The solar thermal power plant of claim 76,
further comprising a back-reflector adjacent the heat pipe at a side thereof opposite the reflective parabolic trough, for reflecting radiation from said heat pipe back thereto.

86. The solar thermal power plant of claim 70,
wherein said solar tracker uses a shadow of said back-reflector for said optimal alignment determination.

87. The solar thermal power plant of claim 68,
wherein said heat storage means comprises a thermal container and a mixture of lithium hydride and lithium metal contained therein.

88. The solar thermal power plant of claim 87,
wherein said mixture of lithium hydride and lithium metal is in substantial equilibrium with dissociation products, including hydrogen gas, and liquid phase lithium and lithium hydride.

89. The solar thermal power plant of claim 87,
wherein said thermal container includes an inner containment shell structure and an outer vacuum shell supporting an evacuated space therebetween.

90. The solar thermal power plant of claim 89,
wherein said thermal container includes thermal battery insulation in said evacuated space comprising multiple layers of highly reflective material to shield against radiation.

91. The solar thermal power plant of claim 68,
wherein said heat engine is a Stirling engine having a hot side heat exchanger and a cold side heat exchanger.

92. The solar thermal power plant of claim 91,
wherein said Stirling engine includes at least one helical groove on one of a crankshaft and a journal surrounding said crankshaft, for self-pressurizing said Stirling engine.

93. The solar thermal power plant of claim 92,
wherein said Stirling engine includes a crankcase pressure relief valve for controlling the crankcase pressure and the power output of said Stirling engine.

94. The solar thermal power plant of claim 92,
wherein said Stirling engine is hermetically sealed and uses helium as the working fluid therein.

95. The solar thermal power plant of claim 94,
wherein said Stirling engine includes a crankcase pressure relief valve for controlling the crankcase pressure and the power output of said Stirling engine, and a sealed chamber connected to said crankcase pressure relief valve and an intake end of said helical groove, for recycling helium released by said crankcase pressure relief valve.

96. The solar thermal power plant of claim 91,
wherein said Stirling engine includes cooling fins adjacent the cold side heat exchanger.

* * * * *